United States Patent [19]

Aso et al.

[11] Patent Number: 5,013,881
[45] Date of Patent: May 7, 1991

[54] WIRE-EXTENSION END DETECTOR

[75] Inventors: Toshiyuki Aso; Yasuo Arakawa, both of Yamanashi, Japan

[73] Assignee: Fancu Ltd., Minamitsuru, Japan

[21] Appl. No.: 378,195

[22] PCT Filed: Oct. 27, 1988

[86] PCT No.: PCT/JP88/01089
§ 371 Date: Jun. 21, 1989
§ 102(e) Date: Jun. 21, 1989

[87] PCT Pub. No.: WO89/03743
PCT Pub. Date: May 5, 1989

[30] Foreign Application Priority Data

Oct. 27, 1987 [JP] Japan .................. 62-269344

[51] Int. Cl.$^5$ .................. B23H 7/10
[52] U.S. Cl. .................. 219/69.12
[58] Field of Search .................. 219/69.12; 250/555

[56] References Cited

U.S. PATENT DOCUMENTS

| 4,581,514 | 4/1986 | Inoue | 219/69.12 |
| 4,608,475 | 8/1986 | Inoue | 219/69.12 |
| 4,698,476 | 10/1987 | Yamamoto et al. | 219/69.12 |
| 4,719,449 | 1/1988 | Cousseau | 250/555 |

FOREIGN PATENT DOCUMENTS

| 149126 | 9/1982 | Japan . | |
| 177234 | 10/1983 | Japan . | |
| 297025 | 12/1986 | Japan | 219/69.12 |

Primary Examiner—Geoffrey S. Evans
Attorney, Agent, or Firm—Staas & Halsey

[57] ABSTRACT

A wire-extension end detector having high operational reliability is provided for use with a wire-cut electric discharge machine. As a wire comes between a wire drive roller and a pinch roller during a wire extension, it is conveyed by rotation of the rollers. As the wire travels, a disc (4c) integral with a tension brake roller driven by the running wire is rotated. A signal processing circuit (24) receives and delivers a pulse train output from a photoelectric switch (5) in accordance with a black-and-white code pattern on a rotating disc coupled thereto, and generates an H-level output indicative of the end of wire extension. If the wire extension fails, an H-level output from the signal process circuit is not output and a wire extension is carried out again.

9 Claims, 2 Drawing Sheets

WIRE-EXTENSION END DETECTOR

BACKGROUND OF THE INVENTION

The present invention relates to a wire-extension end detector for a wire-cut electric discharge machine, which is highly reliable in detecting action.

An apparatus provided in a wire-cut electric discharge machine for carrying out an automatic extension of a wire, disconnected intentionally to allow a workpiece to be shifted to change a discharge machining portion thereof or disconnected accidentally during the discharge machining, is disclosed in Japanese Patent Disclosure No. 62-44319, for example. In this type of automatic wire extension apparatus, a wire, supplied through a wire passage of an upper wire guide arranged above a workpiece, is fed into a groove or hole of the workpiece while being restricted by a machining liquid jetted from a nozzle formed in the upper wire guide. The wire is then passed through a wire passage of a lower wire guide. Subsequently, the wire is fed to a conveyor device arranged under the lower wire guide. The conveyor device includes a pair of belts pressed against each other, so that the wire is conveyed, while held between the belts, in between a wire drive roller and a pinch roller arranged downstream of the coveyor device. The wire extension is completed when the wire is held bewteen the wire drive roller and the pinch roller. When the wire extension comes to an end, an electric power supplying section which is electrically connected to the wire becomes connected through the wire, the electrically conductive outer peripheral wall of the wire drive roller, and an electrically conductive brush pressed against the outer wall of the wire drive roller, to an electric power supplied section which is connected to the brush. The resulting supply of electric power from the power supplying section to the power supplied section is detected by a suitable means as an end of wire extension.

As described above, the prior art wire-extension end detector uses the brush pressed against the wire drive roller, and therefore is liable to suffer disconnection between the brush and the roller as the brush is worn aw  with repeated use, thus failing to detect the end of a  re extension.

SUMMARY OF THE INVENTION

An object of the present invention is to provide an automatic wire-extension end detector for a wire-cut electric discharge machine, which does not use electrical components that mechanically contact one another, and thus is capable of highly reliable detection of the end of a wire extension.

To achieve the above object, a wire-extension end detector of the present invention is provided in a wire-cut electric discharge machine which has a wire conveyor device including wire drive means for running a wire delivered by automatic wire extension means. The wire-extension end detector comprises a rotary member arranged to face a wire travel path and rotatively driven by the wire which is driven to travel by the wire drive means, detection means arranged in a non-contact relation to the rotary member, for generating an output indicating that the rotary member is rotating, when the rotary member is rotated, and discrimination means responsive to an operation of the wire drive means, an operation of the automatic wire extension means, and to the output of the detection means. The discrimination means is operable to detect the end of a wire extension when an output of the detection means is generated before a predetermined time passes after the automatic wire extension means starts operation, during the operation of the wire drive means.

As described above, the wire-extension end detector of the present invention is so arranged as to detect the end of a wire extension in a non-contact fashion in which the wire is driven to by the wire drive means, without using any electrical components that mechanically contact one another, and accordingly can reliably detect the end of the wire extension.

DESCRIPTION OF THE PREFERRED EMBODIMENT

Figure 1:
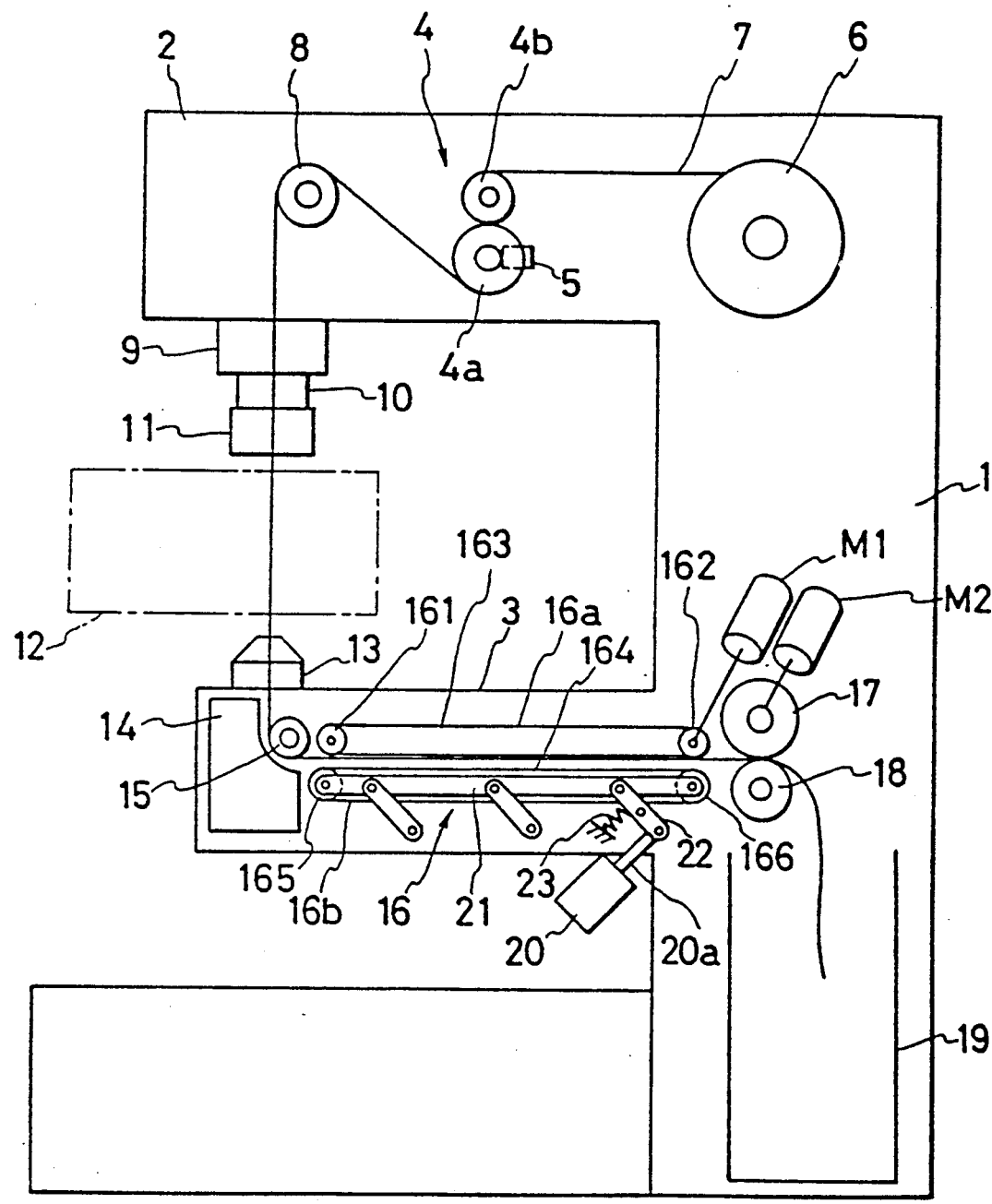
FIG. 1 is a schematic side view of a wire-cut electric discharge machine equipped with a wire-extension end detector according to one embodiment of the present invention.

In FIG. 1, a wire-cut electric discharge machine comprises a column 1 having a wire feed bobbin 6 arranged at an upper portion thereof. An upper arm 2 extending substantially horizontally from one end face of the column is provided with a braking device 4. The forking device 4 is composed of a pinch roller 4b and a tension brake roller 4a cooperating with the roller 4b to apply a tension force on a wire 7. The upper arm 2 is also provided with a guide roller 8 for guiding the wire 7, a U-V axis unit 9, and an upper wire guide 10 driven by the unit 9 to be movable within a horizontal plane. To the upper wire guide 10 is mounted an automatic wire extension means 11 of a conventionally known type. A lower arm 3, extending from the column 1 in parallel with the upper arm 2, is provided with a lower wire guide 13 opposed to the upper wire guide 10. A workpiece 12 located between the opposed wire guides is placed on a work table (not shown) which is movable within a horizontal plane. The lower arm 3 is further provided with a guide block 14 and a guide roller 15 opposed to each other for cooperatively guiding the wire 7, and a converyor means 16 arranged downstream of the roller 15.

The conveyor means 16 comprises an upper conveyor 16a and a lower conveyor 16b movable toward and away from the upper conveyor 16a. The upper conveyor 16a includes a plurality of rollers (only two of them are illustrated with numerals 161 and 162) rotatably supported by the lower arm 3. A belt 163 is wound around these rollers. The roller 162 at the downstream end is coupled to a motor M1. The lower conveyor 16b includes a plurality of rollers (only two of them are illustrated with numerals 165 and 166) around which a belt 164 is wound. A pair and a pair of side plates (only one of them is illustrated with numeral 21) rotatably supports the rollers. The lower conveyor 16b is swingably supported by the lower arm 3 through a plurality of links 22 coupled at one end to the side plates and coupled at another end or an intermediate portion thereof to the lower arm 3. The link 22 at the downstream end is urged by a spring 23 in a direction along which the lower conveyor 16b is moved away from the upper conveyor 16a, and has an end coupled to the distal end of a piston rod 20a of an air cylinder 20. At a downstream side of the conveyor means 16 a wire drive roller 17 coupled to a motor M2, a pinch roller 18 pressed against the roller 17, and a wire recovery box 19 are provided.

Figure 2:
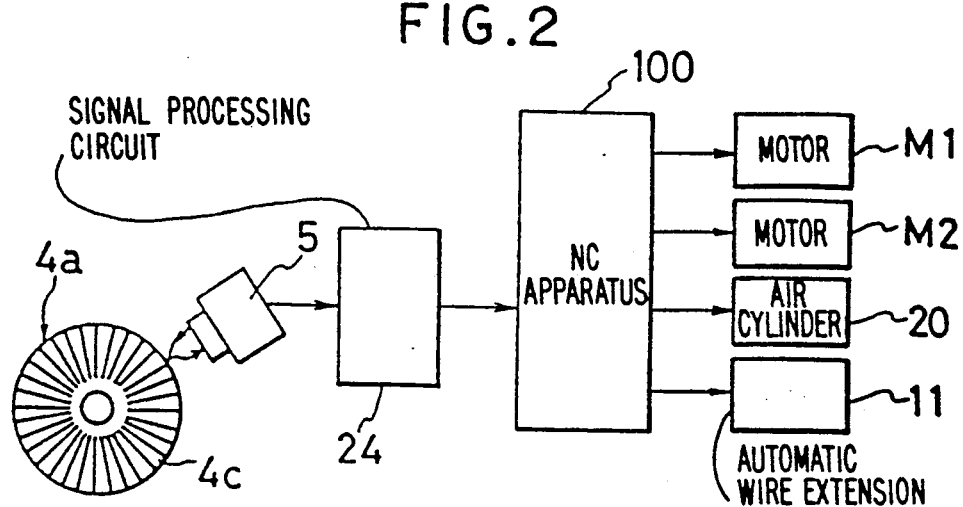
FIG. 2 is an enlarged partial view illustrating, of a disc mounted to a tension brake roller of FIG. 1, and a photoelectric switch, and their peripheral elements.
Figure 3:
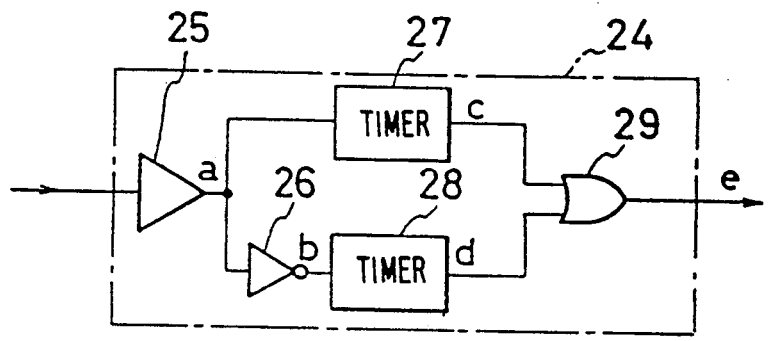
FIG. 3 is a circuit diagram of a signal processing circuit connected to the photoelectric switch.
Figure 4:
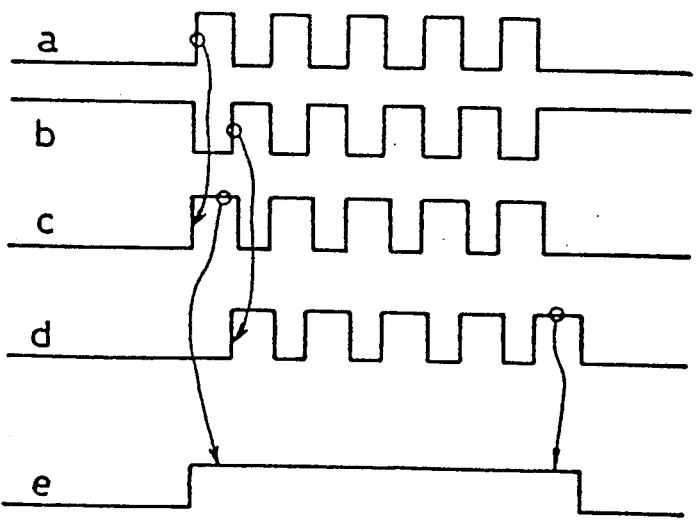
FIG. 4 is a waveform diagram of signal waveforms at various points of the signal processing circuit.

A wire-extension end detector is used with the automatic wire extension and conveyance apparatus composed of the aforementioned elements 4, 8–11, 13–18, 20–22, M1 and M2. The wire-extension end detector comprises, as shown in FIG. 2, a disc 4c secured to the tension brake roller 4a and having a black-and-white code pattern thereon, a photoelectric switch 5 opposed to the disc 4c and having a light projecting portion and a light receiving portion, a signal processing circuit 24 connected to the switch 5, and a numerical control apparatus 100 connected to the elements 11, 20, 24, M1 and M2. The signal processing circuit 24 comprises, as shown in FIG. 3, an amplifier 25 having an input terminal connected to the output terminal of the photoelectric switch 5, timers 27 and 28 having individual input terminals connected to the output terminal of the amplifier 25 directly and indirectly through an inverter 26, respectively, and an OR circuit 29 having input terminals connected to the respective output terminals of the timers. The timers each comprise a retriggerble one-shot multivibrator whose pulse width is variably adjustable for example in accordance with the speed of travel of the wire.

The operation of the wire-cut electric discharge machine constructed as above will now be described.

At the start of a wire extension, an on-off valve (not shown) of the automatic extension means 11, arranged in a machining liquid channel system (not shown), is opened in response to a command signal from the numerical control apparatus 100, as is the case with a conventional apparatus. Accordingly, a machining liquid is jetted from a nozzle (not shown) of the extension means 11 arranged in alignment with a wire passage (not shown) of the upper wire guide 10. The wire 7 passed through the wire passage is, while being restricted by the jet of the machining liquid, inserted into a machining initial hole or machining groove (not shown) formed in the workpiece 12 and then into a wire passage (not shown) of the lower wire guide 13. Also in response to the aforesaid command signal, the air cylinder 20 and the motors M1 and M2 are actuated to move the lower conveyor 16b toward the upper conveyor 16a until the belts of these conveyors are in urging contact with each other. The belts run, at the side of their opposed surfaces, from left to right in FIG. 1 with counterclockwise rotation of the roller 162.

The wire 7 inserted into the wire passage of the lower wire guide 13 is guided between the belts by the guide block 14 and the guide roller 15. Thus, as the belts run, the wire 7 is conveyed while being held between the belts and finally has the leading end thereof held between the wire drive roller 17 and the pinch roller 18. Thereafter, with rotation of the roller 17, the wire 7 is conveyed while being held between the rollers 17 and 18.

As the wire 7 travels in this manner, the tension brake roller 4a cooperates with the pinch roller 4b to hold the wire 7 therebetween. Thus, the disc 4c secured to the roller 4a is rotated. Accordingly, the photoelectric switch 5, which projects light from its light projecting portion toward the disc 4c for reflection, receives light whose amount varies in accordance with the black-and-white pattern of the disc 4c, at its light receiving portion, and delivers a corresponding pulse train which is amplified by the amplifier 25 to obtain a pulse train a. The pulse train a is applied to the timer 27 and the inverter 26. The timers 27 and 28 are triggered, respectively, by the rise of each pulse of the pulse train a and the rise of each pulse of a pulse train b output from the inverter 26, and provide pulse trains c and d having respective predetermined pulse widths, respectively. The pulse widths of the pulse trains c and d are set to values in accordance with the travel speed of the wire, more particularly, to values slightly larger than half of the pulse width of the pulse train supplied from the photoelectric switch 5. Consequently when the wire 7 is conveyed at a predetermined speed by the wire drive roller 17, at least one of the pulse trains c and d is H-level, and accordingly an output e of the OR circuit 29 to which both the pulse trains are applied maintains an H-level indicative of a wire extended state.

When the H-level output is received from the OR circuit 29 during a predetermined time after the start of the wire extension, the numerical control apparatus 10 renders the air cylinder 20 and the motor M1 inoperative. As a result, the lower conveyor 3 is moved away from the upper conveyor 2 by the force of the spring 23, and thus the belt 164 of the lower conveyor 3 is set apart from the wire 7. The belt 163 of the upper conveyor 2 is positioned such that the surface facing the wire 7 is spaced therefrom when the wire is tensed between the rollers 15 and 18, and therefore is also brought to a non-contact state with the wire 7. Thus, the belts 163 and 164 stop running. Thereafter, the wire 7 is conveyed by the wire drive roller 17 and the pinch roller 18 which are driven continuously by the motor M2 after the wire extension. The wire 7 used for the discharge machining is deposited in the wire recovery box 19.

When the wire 7 is not conveyed during the wire extension, for example, due to a failure of the insertion of the wire 7 into the wire passage of the lower wire guide 13, the tension brake roller 4a and the disc 4c integral therewith are not rotated. Therefore, no pulse train is sent from the photoelectric switch 5. This maintains the output of the signal processing circuit 24 at an L-level indicative of an incomplete wire extension. If the output of the circuit 24 is still an L-level when the predetermined time, which is set to a value longer than a normally required wire extension time, passes after the start of the wire extension, the numerical control apparatus 100 judges that the wire extension failed, and retries a wire extension in accordance with the aforementioned procedure.

The embodiment described above uses the signal processing circuit 24 including two timers 27 and 28, but a circuit including one timer may alternatively be used. In this case, the width of the output pulse from the timer is set to a value larger than the output pulse width of the photoelectric switch 5. Further, although a multivibrator is used for each of the timers 27 and 28 in the above embodiment, an R-C circuit may alternatively be used such that a capacitor, charged above a predetermined level by the H-level output of the amplifier 25, is discharged below the predetermined level through a resistor before a time slightly longer than the L-level time of the amplifier 25 passes after the inversion of the output level. Moreover, in the above embodiment, completion of a wire extension is detected optically using the disc 4c rotatable with the tension brake roller 4a and having a black-and-white pattern thereon, and the photoelectric switch 5. Such detection may alternatively be effected magnetically or electrically. For example, it is possible to use a combination of a rotor rotatable with the roller 4a and a plurality of permanent magnets embedded in the peripheral wall of the rotor in a manner such that adjacent magnets have opposite polarities, or a tachometer generator rotatable with the roller 4a.

We claim:

1. A wire-extension end detector provided in a wire-cut electric discharge machine having a wire conveyor device including wire drive means for running a wire delivered by automatic wire extension means, comprising:

a rotary member arranged facing a wire travel path and rotatively driven by the wire which is driven by the wire drive means;

detection means, arranged in a non-contact relation with said rotary member, for generating an output indicating that said rotary member is rotating when said rotary member is rotated; and discrimination means, responsive to an operation of the wire drive means, and an operation of the automatic wire extension means, and connected to receive the output of said detection means, said discrimination means detecting the end of a wire extension when an output of said detection means is generated before a predetermined time passes after the start of the automatic wire extension means, during the operation of the wire drive means.

2. The wire-extension end detector according to claim 1, wherein said rotary member comprises a tension roller.

3. The wire-extension end detector according to claim 1, wherein said detection means comprises:

a disc rotatable with said rotary member and having a code pattern thereon; and a photoelectric switch means opposed to said disc.

4. The wire-extension end detector according to claim 1, wherein said wire drive means comprises:

a wire drive roller arranged at a downstream end of the wire conveyor device and driven for rotation; and a pinch roller pressed against said wire drive roller.

5. The wire-extension end detector according to claim 4, wherein the wire conveyor device comprises a pair of belt conveyors arranged upstream of said wire drive roller.

6. The wire-extension end detector according to claim 2, wherein said wire drive means comprises:

a wire drive roller arranged at a downstream end of the wire conveyor device and driven for rotation; and a pinch roller pressed against said wire drive roller.

7. The wire-extension end detector according to claim 3, wherein said wire drive means comprises;

a wire drive roller arranged at a downstream end of the wire conveyor device and driven for rotation; and a pinch roller pressed against said wire drive roller.

8. The wire-extension end detector according to claim 6, wherein the wire conveyor device means comprises a pair of belt conveyors arranged upstream of said wire drive roller.

9. The wire-extension end detector according to claim 8, wherein the wire conveyor device comprises a pair of belt conveyors arranged upstream of said wire drive roller.

* * * * *